United States Patent
Barois et al.

(10) Patent No.: US 11,863,247 B2
(45) Date of Patent: Jan. 2, 2024

(54) METHOD FOR DETERMINING A MODE OF COMMUNICATION BETWEEN TWO NEIGHBOURING DEVICES OF A NETWORK

(71) Applicant: SAGEMCOM ENERGY & TELECOM SAS, Rueil Malmaison (FR)

(72) Inventors: Jérôme Barois, Rueil Malmaison (FR); Clément Terrien, Rueil Malmaison (FR); Julien Barthes, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 203 days.

(21) Appl. No.: 17/355,654

(22) Filed: Jun. 23, 2021

(65) Prior Publication Data

US 2022/0006490 A1    Jan. 6, 2022

(30) Foreign Application Priority Data

Jul. 1, 2020   (FR) ..................................... 2006948

(51) Int. Cl.
*H04B 3/54*    (2006.01)
*H04B 3/46*    (2015.01)

(52) U.S. Cl.
CPC ............. *H04B 3/544* (2013.01); *H04B 3/46* (2013.01)

(58) Field of Classification Search
CPC .. H04B 3/54; H04B 3/542; H04B 2203/5404; H04B 2203/5462; H04B 2203/5495
See application file for complete search history.

(56) References Cited

U.S. PATENT DOCUMENTS

| | | | |
|---|---|---|---|
| 2004/0161041 A1* | 8/2004 | Logvinov | H04B 3/542 375/257 |
| 2012/0134395 A1* | 5/2012 | Varadarajan | H04B 3/542 375/220 |
| 2012/0201155 A1 | 8/2012 | Du et al. | |
| 2012/0275326 A1* | 11/2012 | Vedantham | H04W 72/542 370/252 |
| 2013/0101055 A1 | 4/2013 | Pande et al. | |
| 2014/0198859 A1* | 7/2014 | Farrokhi | H04L 7/0008 375/257 |

OTHER PUBLICATIONS

Mar. 9, 2021 Search Report issued in French Patent Application No. 2006948.

* cited by examiner

*Primary Examiner* — Kevin Kim
(74) *Attorney, Agent, or Firm* — Williams Mullen; R. Brian Drozd

(57) ABSTRACT

A method for determining a mode of transmission between two nodes of a power line communication network, the method comprising transmitting a first message from the first node to the second node in at least two frequency bands, said first message comprising, in each of the at least two frequency bands, information according to which a channel estimate is requested; the first node receiving at least one second message transmitted from the second node and comprising information representative of a channel estimate of at least one of the frequency bands in response to the first message; and determining a transmission mode for transmitting a third message to be transmitted based on the information received from the second node in response to the first message. The invention also relates to a device configured so as to execute the method.

8 Claims, 6 Drawing Sheets

METHOD FOR DETERMINING A MODE OF COMMUNICATION BETWEEN TWO NEIGHBOURING DEVICES OF A NETWORK

TECHNICAL FIELD

At least one embodiment of the present invention relates to a method for transmitting a message from a first node device to a second node device belonging to a network neighbourhood of the first node device, said first and second node devices belonging to a network using power line communications. At least one embodiment of the present invention relates to a device implementing the method.

PRIOR ART

Power line communications (PLC) are becoming more widespread, in particular in the context of AMM (abbreviation for "Automated Meter Management") electricity supply networks. Communication networks are thus implemented in electricity supply networks in order for a base node device (also called "data hub") of the network to automatically collect, from smart electricity meters, energy consumption reading data that said smart electricity meters are respectively responsible for monitoring.

The G3-PLC communication standard is defined so as to allow the various node devices (in particular data hub and smart electricity meters) of such a network to communicate with one another. The standard is specified in the ITU-T G.9903 recommendation, which describes in particular the physical layer (PHY) and the data link layer (DLL) of the OSI (acronym for "Open Systems Interconnection") model. The G3-PLC standard is intended to be used in frequency bands ranging from 10 to 490 kHz. More specifically, it supports the following frequency bands: the CENELEC A frequency band, which ranges approximately from 35 kHz to 91 kHz: the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz. These various frequency bands have different characteristics in terms of data rate, range, and resistance to interfering factors in particular.

However, the G3-PLC standard permits the use of only one of said frequency bands for a given node device. More precisely, modern node devices may sometimes support a plurality of frequency bands, but not at the same time. A reconfiguration is then required in order to change from a first frequency band to a second frequency band. Thus, when, in a communication network, it is necessary to reconfigure a set of data hub devices and a set of electricity meters associated therewith in a new frequency band, a reconfiguration may prove to be particularly complex. For example, a meter device that has not been able to receive a message telling it to change frequency band may become incapable of communicating with the data hub device with which it is associated after the latter has for its part been able to change frequency band.

However, the needs in terms of resources of communication networks, in particular in the deployment of AMM electricity supply networks, are increasing on a daily basis. The frequency band for which the elements forming a network have been certified may be at a capacity limit, thereby forming an obstacle to increasing the number of exchanges in the network, for example in order to introduce new functionalities or even new application needs, for example.

It is desirable to overcome these various drawbacks from the prior art. It is thus desirable in particular to propose a power line communication-based solution that makes it possible to increase the capacity for the number of exchanges in the communication network. It is in particular desirable to propose a solution that is applicable to AMM electricity supply networks.

SUMMARY OF THE INVENTION

To this end, one subject of the invention is a method for determining a mode of transmission between first and second node devices of a power line communication network, the first node device being located in the network neighbourhood of the second node device and vice versa, the first node device being configured so as to communicate in at least two frequency bands, and the second node device being configured so as to communicate in at least one of said at least two frequency bands, the method being executed by the first node device, the method being characterized in that it comprises:
  transmitting a copy of a first message to the second node device in each of said at least two frequency bands, said first message comprising information according to which a channel estimate is requested from the second node device by said first node device,
  receiving a second message transmitted by the second node device on each frequency band via which the second node device has received a said copy of the first message, each second message comprising information representative of a channel estimate for the frequency band via which said second message is received,
  the first node device recording the information, representative of the channel estimate, contained in each received second message, and
  determining, based on the recorded information, a transmission mode for transmitting a third message to be transmitted subsequently from the first node device to the second node device.

It is thus advantageously possible to use a plurality of frequency bands simultaneously. The advantages stemming from simultaneous use of a plurality of frequency bands are for example increasing the average speed of transmissions between two neighbouring nodes, and therefore more broadly through the communication network, optimized distribution of the load of the network over a plurality of frequency bands, and better communication in an environment subjected to interference. The capacity for the number of exchanges in the network is thus increased.

The method according to the invention may also comprise the following features, considered on their own or in combination:
  The method furthermore comprises transmitting a fourth message, to the second node device, this fourth message comprising a reference to what is called an "extended" frequency band, the extended frequency band comprises the at least two frequency bands, and the fourth message comprises information according to which a channel estimate of the extended frequency band is requested from the second node device by said first node device.
  Processing a plurality of frequency bands in a manner aimed at considering that the set of these frequency bands forms a single extended band makes it possible to simplify the management of a communication network executing the described method.

Determining the transmission mode comprises a step of comparing first transmission quality indicators that are respectively determined, for each of the frequency bands, based on recorded information associated with each of the at least two frequency bands.

This advantageously makes it possible to select one or more frequency bands to be used on the basis of the interference level detected for each of them.

Determining a transmission mode furthermore comprises selecting what is called a "robust" transmission mode according to a quality level defined based on an estimate of a transmission channel established via a multi-band transmission in said at least two frequency bands. The term "robust transmission mode" is understood here to mean a transmission mode using BPSK (Binary Phase Shift Keying) modulation, for which each bit is repeated a plurality of times (four times or six times for example).

Advantageously, if a performance problem is detected in a frequency band, it is possible to use a more robust communication mode, even though the communication data rate thereof is reduced for this frequency band.

The at least two frequency bands are taken from among the following group: CENELEC A frequency band, CENELEC B frequency band, and FCC frequency band or ARIB frequency band.

This advantageously makes it possible to implement the protocol according to the invention in a communication network context compatible with the G3-PLC (ITU-T G9903) standard or one of its evolutions.

The information according to which a channel estimate is requested from the second node device by the first node device is a Tone Map Request indicator of a frame control header defined according to the ITU-T G9903 recommendation and the information representative of at least one channel estimate and received from said second node device is contained in a Tone Map Response message defined according to the ITU-T G9903 recommendation.

Another aim of the invention is to propose a node device intended to be used in a power line communication network, the node device being configured so as to communicate with a second node device placed in one and the same network neighbourhood of said communication network, the node device comprising:

a transmission module configured so as to transmit, to the second node device in at least two frequency bands, a first message comprising, in each of the at least two frequency bands, information according to which a channel estimate is requested from the second node device, a reception module for receiving at least one second message, transmitted from the second node device and comprising one or more items of information representative of a channel estimate of at least one of the frequency bands, in response to said first message, a recording module configured so as to record, in a memory of said node device, the one or more items of information representative of at least one channel estimate, received from said second node device, a control unit configured so as to determine, based on the one or more items of information recorded in said memory, a transmission mode for transmitting a third message to be transmitted from said node device to the second node device.

Another subject of the invention is a computer program product comprising program code instructions for executing the steps of the method described above when this program is executed by a processor, and also an information storage medium comprising this computer program product.

BRIEF DESCRIPTION OF THE DRAWINGS

The abovementioned features of the invention, and others, will become more clearly apparent on reading the following description of at least one exemplary embodiment, said description being given with reference to the appended drawings, in which.

DETAILED DESCRIPTION OF EMBODIMENTS

Figure 1:
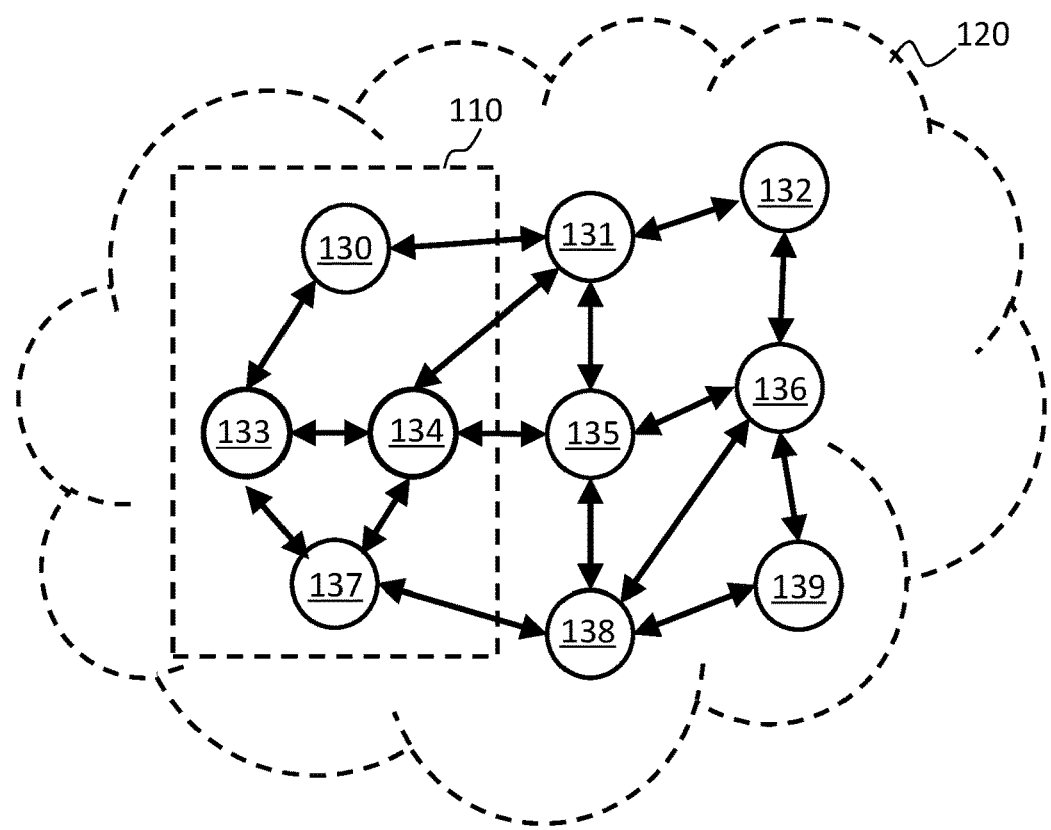
FIG. 1 illustrates an electricity supply network using power line communications.

FIG. 1 schematically illustrates a communication network 120. The communication network 120 is based on power line communications PLC. The communication network 120 is for example an AMM electricity supply network allowing a base node device (also called "data hub") to collect, from smart electricity meters, energy consumption reading data for electrical installations that said smart electricity meters are respectively responsible for monitoring. The data hub and the smart electricity meters are thus node devices of the communication network 120. The communication network 120 may comprise other node devices, for example installed in electrical transformers.

The communication network 120 has a meshed structure. The meshed structure of the communication network 120 is shown schematically in FIG. 1 through arrows representing the communication links between two neighbouring nodes, and in which some node devices act as a relay so as to increase the communication range in the communication network 120. One and the same smart electricity meter thus potentially has a plurality of paths for reaching the data hub, and vice versa.

The present invention is therefore particularly suited to the context of G3-PLC technology.

The communication network 120 thus comprises a plurality of node devices 130, 131, 132, 133, 134, 135, 136, 137, 138, 139. A network neighbourhood is associated with each of the node devices of the communication network 120. For example, the node device 133 in FIG. 1 is associated with a network neighbourhood 110 incorporating the node devices 130, 134 and 137. In the communication network 120, a signal or a message broadcast by a node device, such as for example the node device 133, is not generally visible at any point of the communication network 120. Each node device transmitting signals or messages then has a network neighbourhood, that is to say a subset of the communication network 120, in which any node device is able to intelligibly receive the signals or messages directly from the node device that broadcast these signals or messages. The network neighbourhood corresponds to the range of the transmitted signals, depending on predetermined transmission parameters (for example power, modulation and coding scheme, network topology, etc.) of the node device at the source of the signals and also potentially depending on characteristics of the communication channel, such as for example an attenuation, a noise level or an impedance.

The communication network 120 is based on a reactive routing protocol, such as for example the LOADng ("Lightweight On-demand Ad hoc Distance-vector Routing Protocol—Next Generation") protocol. In contrast to proactive routing protocols, which are based on overall network topology knowledge, reactive routing protocols are based on on-demand route discoveries, each node device of the network then needing only to know its own network neighbourhood in order to route data in the communication network 120.

To discover an appropriate route in the communication network 120 from a source node device (for example the node device 133) to a destination node device (for example the node device 132), it is known that the source node device broadcasts a route discovery request, called RREQ ("Route REQuest"). A copy of this route discovery request is received by each node device in the network neighbourhood of said source node device. Each node device in the network neighbourhood of said source node device relays said copy of the request through broadcasting if said node device in question is not the destination node device. Through step-by-step broadcasting, a plurality of copies of the route discovery request are typically received by the destination node device, each of these copies having taken a different route in the communication network 120.

The use of routing tables stored in the node devices makes it possible to perform point-to-point or unicast communications between any pair of node devices of the communication network 120. Intermediate node devices therefore serve as a relay when the node devices of said pair are not in the network neighbourhood of one another, and the communications thus take place step-by-step, each node device using one of its own neighbours to track messages to their respective intended recipients.

For communication between neighbouring node devices (that is to say node devices that are in the network neighbourhood of one another), the messages are transmitted in the form of modulated frames. When a modulated frame is addressed specifically to a neighbouring node device and it is demodulated correctly thereby, said neighbouring node device retransmits an acknowledgement ACK to the node device that addressed said modulated frame thereto. The acknowledgement ACK is transmitted on the same frequency band as the modulated frame with which said acknowledgement ACK is associated.

A plurality of frequency bands are defined in order to support the transmission of these modulated frames, an appropriate modulation scheme being associated with each of these frequency bands. Each frame transmitted in the form of modulated signals begins with a predefined preamble depending on the modulation scheme in accordance with which said signals were modulated. The preamble is designed to make it possible to perform synchronization at reception on said frame, that is to say to be able to determine an effective frame start time. To this end, the preamble typically comprises a plurality of successive copies of one and the same symbol. The effective content and the duration of the preamble are thus predefined and depend on the modulation scheme that is used. The preambles of a plurality of frames are identical when the same modulation scheme is applied, and differ if not.

The applicable modulation schemes (and corresponding demodulation schemes) are preferably OFDM ("Orthogonal Frequency Division Multiplex") multi-carrier modulation schemes (respectively demodulation schemes).

In one particular embodiment, the frequency bands are separate.

In terms of frequency bands able to be used in the context of implementing the communication network 120, mention may be made of the following: the CENELEC A frequency band, which ranges from approximately 35 kHz to 91 kHz: the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz. It is then possible to use: a first modulation scheme with thirty-six carriers in the CENELEC A frequency band; a second modulation scheme with seventy-two carriers in the FCC frequency band; a third modulation scheme with fifty-four carriers in the ARIB frequency band; and a fourth modulation scheme with sixteen carriers in the CENELEC B frequency band. It is apparent from the above that a node device may simultaneously use a plurality of frequency bands to communicate with one or more of its neighbours by applying an appropriate transmission mechanism. However, it appears that the ARIB and FFC frequency bands cannot be used simultaneously by one and the same node device, given that they overlap.

Advantageously, at least some of the node devices 130, 131, 132, 133, 134, 135, 136, 137, 138, 139 are configured so as to communicate in a plurality of frequency bands. It is therefore important, for a given node device, to be able to determine which communication modes are supported by a node device in its network neighbourhood. The term "supported communication modes" denotes one or more native communication modes of a node device, that is to say that said node device is capable of implementing due to its possible configurations, and also means that these one or more native communication modes are able to be used at a given time, given the possible interference that may exist. The interference may originate for example from a noisy environment.

According to one embodiment of the invention, an initiator node device configured so as to communicate in a plurality of frequency bands with a target neighbouring node device may determine, when needed, which communication modes are supported by this target neighbouring node device prior to sending more substantial messages forming communications.

The term "initiator node device" in this case denotes a device executing the method for determining a communication mode for the purposes of communicating with a target neighbouring node device, that is to say one located in its network neighbourhood. The term "target node device" in this case denotes a device receiving one or more channel estimate requests from a neighbouring initiator node device executing the method for determining a communication mode and that will normally be the intended recipient (and therefore the target), after determining a communication mode, for communications performed in this mode.

In order to determine which communication modes are supported by a target neighbouring node device (for example the node device 134), an initiator node device (for example the node device 133) sends messages, in each of the frequency bands for which it is configured so as to communicate, to the target neighbouring node device, which messages each comprise information intended to ask the target node device for a channel estimate in the frequency band that is used. The presence of the information intended to ask for a channel estimate forms a channel estimate request. For example, in a network context compatible with the G3-PLC (registered trademark) standard, the information according to which a channel estimate is requested by an initiator node device from a target neighbouring node device is a Tone Map Request indicator of a frame control header defined according to the ITU-T G9903 recommendation and the information representative of at least one channel estimate and received from the target neighbouring node device is contained in a Tone Map Response message defined according to the ITU-T G9903 recommendation.

The initiator node device then analyses the one or more responses possibly received from the target node device and determines, using the one or more items of information received in one or more possible messages received in response, which communication modes are supported by the target neighbouring node device, and then possibly which communication mode has the best performance out of these available communication modes. The information received in response to a channel estimate request is representative, besides the capability of the target node device to receive a message in a given frequency band, of the quality of the channel established in this frequency band.

According to one embodiment, the response message to a channel estimate request is implemented in the form of an information block called Tone Map Response, as defined in the G3-PLC standard (ITU G.9903 March 2017 edition). In one exemplary embodiment, the Tone Map Response data block comprises information such as the type of modulation that it uses for the frequency band in question and a link quality indicator LQI.

The Tone Map Response data block may contain other information as defined in table 9.9 of section 9.3.5.2.2 of the ITU-T G9903 recommendation (March 2017 version), in particular a tone map. The tone map is a list of subcarriers used to communicate in a given frequency band. According to one embodiment, the target node device, neighbouring the initiator node device, responds to the neighbouring initiator node device in each of the frequency bands in which it has received a message comprising a channel estimate request. Thus, a lack of response in one of the frequency bands used by an initiator node device to address a channel estimate request means that the target node device is not configured so as to communicate in this frequency band with the initiator node device, or else that the target node device was not able to correctly receive the channel estimate request due to interference in the transmission of the message comprising this request, or that this frequency band was not able to be used by the initiator node device to communicate with the target node device.

According to one embodiment, the initiator node device records the one or more items of information representative of a channel estimate for each frequency band for which it received such information in response to a channel estimate request.

The initiator node device then determines, based on this information, which communication modes are supported by the target neighbouring node device and records this information in a neighbourhood information table that comprises information representative of parameters of all of the identified neighbouring node devices.

According to one variant, an initiator node device may comprise a plurality of neighbourhood tables, each of the tables corresponding to a previously detected and identified target neighbouring node device.

When a new node device is added to the network neighbourhood of a given node device, information corresponding to this new neighbouring node device is added to the one or more neighbourhood information tables of the neighbouring node devices after the new node device has been able to be detected and identified and the parameters to be recorded have been able to be defined through message exchanges similar to those described above, in particular.

A node device of the network that wishes to initiate communication with a neighbouring node device may thus advantageously consult the neighbourhood information table that corresponds to the target node device in order to determine which communication mode is the best one to use with this target node device.

If a communication problem occurs, such as the complete absence of transmission or else transmission subjected to strong interference, or else if a validity time of a neighbourhood information table has expired, the initiator node device that initiated the communication may simply execute the method for determining a communication mode again in order to redefine which communication modes are supported by the target node device, and possibly the best communication mode for communicating with this target node device, prior to establishing any new communication with this target node device.

Communication problems may be detected through an error rate check or else through using protocols intended to verify the correct reception or else the integrity of the transmitted messages.

Figure 2:
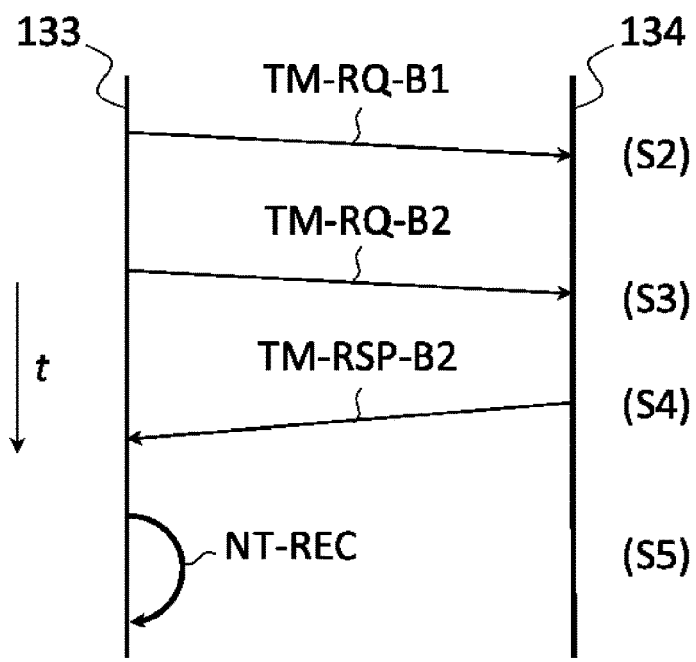
FIG. 2 illustrates a first message protocol exchange between two neighbouring node devices of the network already described in FIG. 1, according to one embodiment.

FIG. 2 illustrates a first exchange of messages between the node device 133 and the node device 134 neighbouring the node device 133. The node devices 133 and 134 are represented by vertical bars located, respectively, on the left and on the right in FIG. 2, and the messages exchanged between the two devices are each represented by an arrow going from one to the other of the node devices 133 and 134 neighbouring one another. Reading from top to bottom in FIG. 2 corresponds to a chronological sequence of steps (here S2 to S5) and illustrates key steps of one example of a method for determining a communication mode according to one embodiment.

Thus, in a step S2, the communication node device 133 addresses a message TM-RQ-B1, comprising information according to which a channel estimate is requested from the node device 134 for the frequency band B1 (channel estimate request), to the node device 134. The channel estimate request of the message TM-RQ-B1 is addressed to the node device 134 by the node device 133 in a frequency band B1. The frequency band B1 is for example a frequency band chosen from among the group of frequency bands consisting of the CENELEC A frequency band, the CENELEC B frequency band, and the FCC frequency band or the ARIB frequency band.

According to one embodiment, the channel estimate request is implemented in the form of a bit set to 1 in a TMR field of a frame control header of a message, as defined in the G3-PLC standard (ITU G.9903 2017 edition). Similarly, the node device 133 also addresses a second message TMR-RQ-B2, comprising a channel estimate request, to the node device 134 in a step S3. The channel estimate request of the message TM-RQ-B2 is addressed to the node device 134 by the node device 133 in a frequency band B2. The frequency band B2 is for example also a frequency band chosen, separately from the frequency band B1, from among the group of frequency bands consisting of the CENELEC A frequency band, the CENELEC B frequency band, and the FCC frequency band or the ARIB frequency band. In this exemplary message exchange, the node device 134 does not respond to the channel estimate request in the frequency band B1, but, in a step S4, addresses a message TM-RSP-B2, in response to the message TM-RQ-B2, comprising one or more items of information linked to a channel estimate in the frequency band B2 performed by the node device 134. According to one embodiment, the response message TM-RSP-B2 is implemented in the form of an information block called "TONE MAP RESPONSE", as defined in the G3-PLC standard (ITU G.9903 2017 edition).

The node device 133 then, in a step S5, records the received information, representative of the channel estimate performed by the node device 134 in the frequency band B2, in the form of an information block in a neighbourhood table NT-REC in a memory internal to the node device 133. The node device 133 is thus advantageously capable of determining that the node device does not support communication in the frequency band B1 or was possibly not able to receive the message TMR-RQ-B1. It is furthermore possible that the message TMR-RQ-B1 sent to the node device 134 by the node device 133 was correctly received by the node device 134 but that the node device 133 was not able to receive any message in response due to interference on the communication link between the two neighbouring node devices 133 and 134.

Based on the information received and recorded in the neighbourhood table NT-REC, the node device 133 is able to determine, prior to subsequent communications with the node device 134, which communication modes are supported thereby, or even which of these communication modes is the supported mode offering the best performance level for one or more messages to be transmitted subsequently to the neighbouring node device 134. According to the example described in FIG. 2, the node device 133 detects that the neighbouring node device 134 is a single-band node device capable of communicating in the frequency band B2.

Advantageously, the node device 133 establishes first quality indicators based on the information successively received and representative of a channel estimate in the frequency bands under test, so as then to be able to determine a transmission mode with the node device 134 by comparing these respectively determined first transmission quality indicators for each of the frequency bands.

Figure 3:
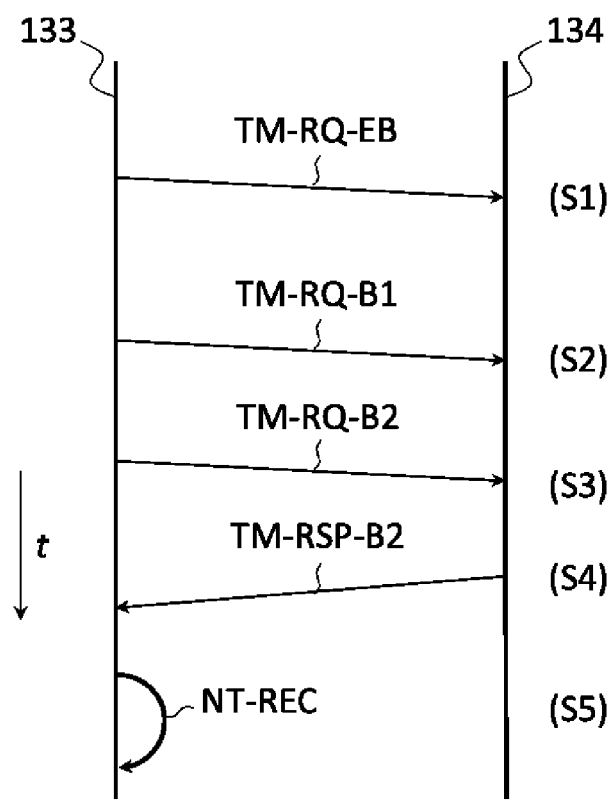
FIG. 3 illustrates a second message protocol exchange between two neighbouring node devices of the network already described in FIG. 1, according to one embodiment.

FIG. 3 illustrates a second exchange of messages between the node device 133 and the node device 134 according to an embodiment similar to that of FIG. 2. According to one embodiment, the node device 133 is a multi-band node device configured so as to communicate in the frequency band B1 and the frequency band B2, but also in a frequency band EB, called "extended band", which groups together the frequency bands B1 and B2. In other words, this means that the node device 133 is configured so as to be able to process communications in the extended frequency band EB that is wider than the frequency band B1 or than the frequency band B2 taken on their own, and that internal circuits of the node device 133 are configured so as to be able to generate a modulated frame on all of the subcarriers of the frequency bands B1 and B2.

Advantageously, the extended frequency band EB covers all of the subcarriers available in the various bands supported by the node device 133, including in particular the frequency bands B1 and B2. Distributing symbols to be transmitted on the extended frequency band EB therefore involves adjusting the encoding, error correction and data interleaving mechanisms used by communication modes for communicating in a "non-extended" band, such as the frequency band B1 or the frequency band B2.

For example, the implementation of the extended frequency band EB may be based on separate transmitter circuits of the node device 133, the driving of which may be pooled under the control of an internal control unit configured so as to manage communications.

Of course, the communication mode for communicating in the extended frequency band EB thus supported is applicable only between compatible node devices, that is to say ones that support the extended frequency band EB. According to one embodiment, a node device supporting the extended frequency band EB may, through configuration, restrict its use to a specific frequency band from among those forming the extended frequency band EB, such as for example the frequency band B1 or else the frequency band B2.

Advantageously, backwards compatibility between node devices is supported by message protocol exchanges, such as that illustrated in FIG. 3.

According to one embodiment, the node device 133, configured so as to communicate in the extended frequency band EB, sends a message TM-RQ-EB to the node device 134. The message is sent to the node device 134 in the extended frequency band EB in accordance with the transposition principle described above, and comprises information according to which a channel estimate is requested from the node device 134 in the extended frequency band EB. According to one embodiment, the channel estimate request is implemented in the form of a bit set to 1 in a TMR field of a frame control header of a message referring to use of the extended frequency band EB, such that, if the node device 134 is configured so as to communicate with the node device 133 in the extended frequency band EB, it sends a message in response to the channel estimate request received from the node device 133. The example illustrated in FIG. 3 thus shows that the node device 134 is not configured so as to communicate with the node device 133 in an extended frequency band EB, since it does not respond to the transmitted message TM-RQ-EB. The node device 133 then sends messages TM-RQ-B1 and TM-RQ-B2 each comprising a channel estimate request in the frequency bands B1 and B2, as already illustrated in FIG. 2.

Sending a channel estimate request in the frequency band EB beforehand allows the node device 133 to check whether the node device 134 supports a communication mode for communicating in an extended frequency band EB, before checking which other possible modes are supported, in the frequency bands B1 and B2 for example. It should be noted that the channel estimate request sent in the extended frequency band EB by the node device 133 to the node device 134 may be addressed before or after the other message exchanges performed in steps S2 to S4.

The capability of the node device 134 to communicate or not communicate with the node device 133 in the extended frequency band EB is recorded in the neighbourhood table NT-REC of the node device 133 in the form of one or more items of information.

Figure 4:
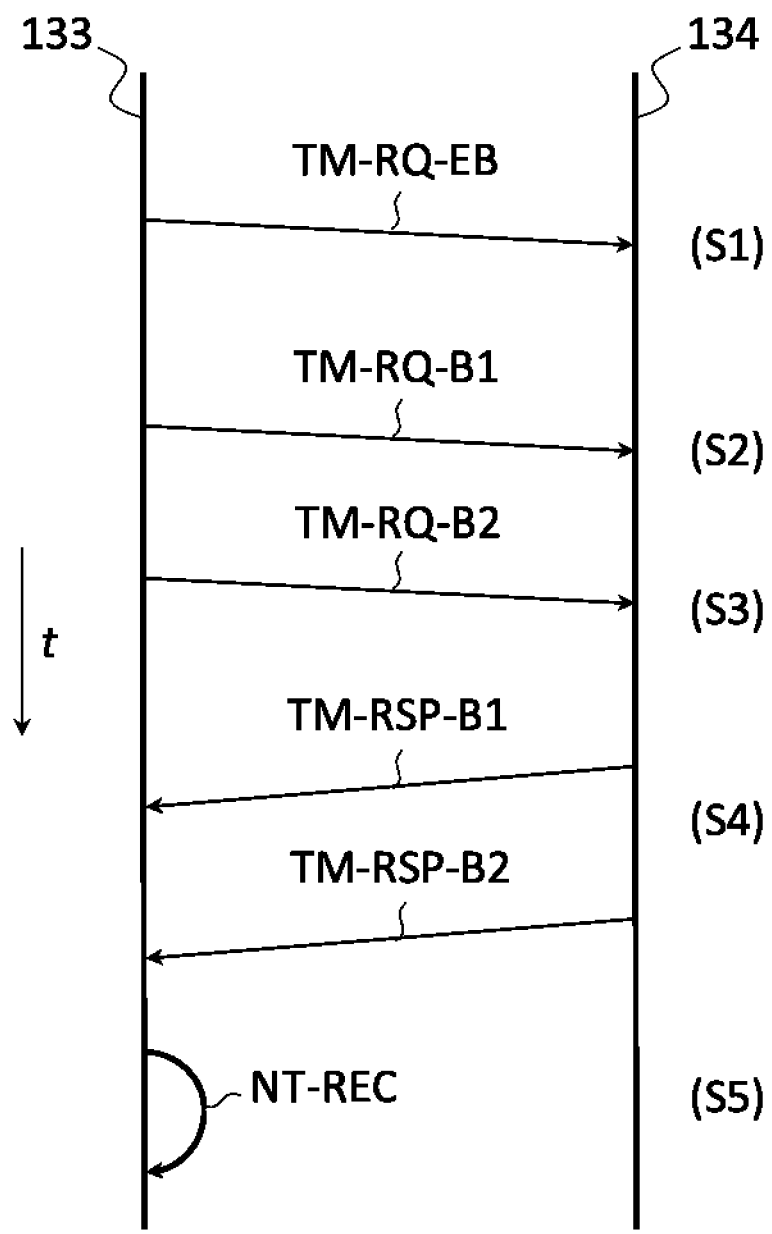
FIG. 4 illustrates a third message protocol exchange between two neighbouring node devices of the network already described in FIG. 1, according to one embodiment.

FIG. 4 illustrates a third exchange of messages between the node device 133 and the node device 134 according to an embodiment similar to that already used in FIG. 2 and in FIG. 3. The exchange of shown messages illustrates that the node device 134 does not respond to the channel estimate request message TM-RQ-EB sent by the node device 133 in step S1, but then responds to the two messages TM-RQ-B1 and TM-RQ-B2 respectively sent to the node device 134 in the frequency bands B1 and B2 in steps S2 and S3. The response messages TM-RSP-B1 and TM-RSP-B2 sent in step S4 each comprise information representative of the channel estimate of the frequency band in question. Thus, the message TM-RSP-B1 comprises information representative of a channel estimate in the frequency band B1 and the message TM-RSP B2 comprises information representative of a channel estimate in the frequency band B2. This information is recorded in the network neighbourhood table NT-REC in step S5. The node device 133 may identify, according to the responses received in this example, that the node device 134 does not support the communication mode for communicating in an extended frequency band EB, but supports communication modes for communicating in the frequency band B1 and in the frequency band B2.

Figure 5:
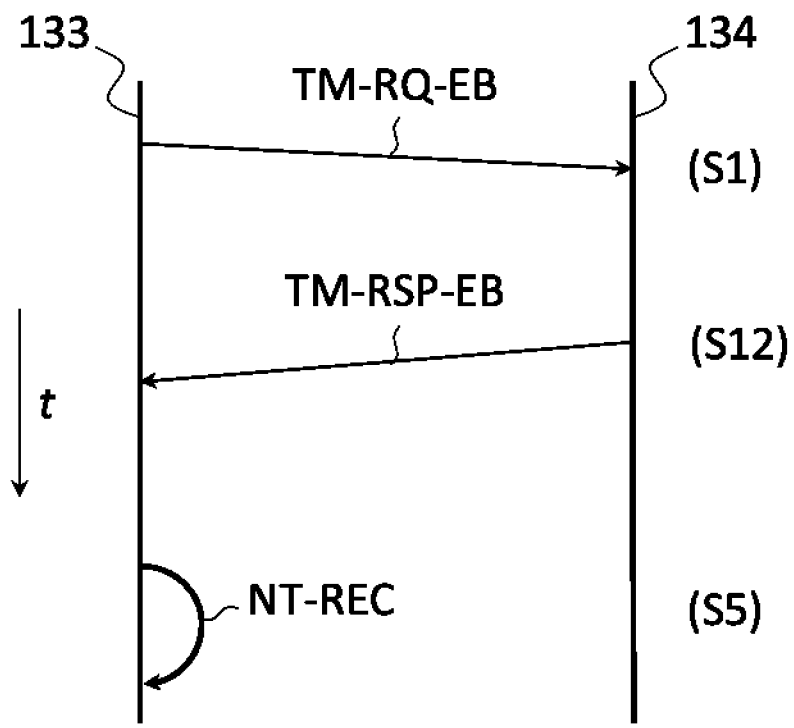
FIG. 5 illustrates a message protocol exchange between two neighbouring node devices of the network already described in FIG. 1, according to one embodiment.

FIG. 5 illustrates a fourth exchange of messages between the node device 133 and the node device 134 according to an embodiment similar to that already used in FIG. 2, in FIG. 3 and in FIG. 4. In this exemplary exchange of messages between the neighbouring node devices 133 and 134, the node device 134 responds to a message TM-REQ-EB transmitted in step S1 and comprising a channel estimate request with a message TM-RSP-EB in a step S12. According to this example, the message TM-RSP-EB, in response to the message TM-REQ-EB, comprises information representative of a channel estimate in an extended frequency band EB, and the node device 133 is able to deduce that the node device 134 is configured so as to communicate therewith in the extended frequency band EB. Thus, for example, following the message TM-REQ-EB, the node device 133 does not address any further message with a view to obtaining a channel estimate in a frequency band other than the extended frequency band EB.

Of course, this example is non-limiting, and it may be beneficial to obtain information regarding the communication in an extended frequency band EB and information regarding each of the other frequency bands B1 and B2 with the node device 134, prior to selection of a communication mode for communicating therewith by the node device 133.

Figure 6:
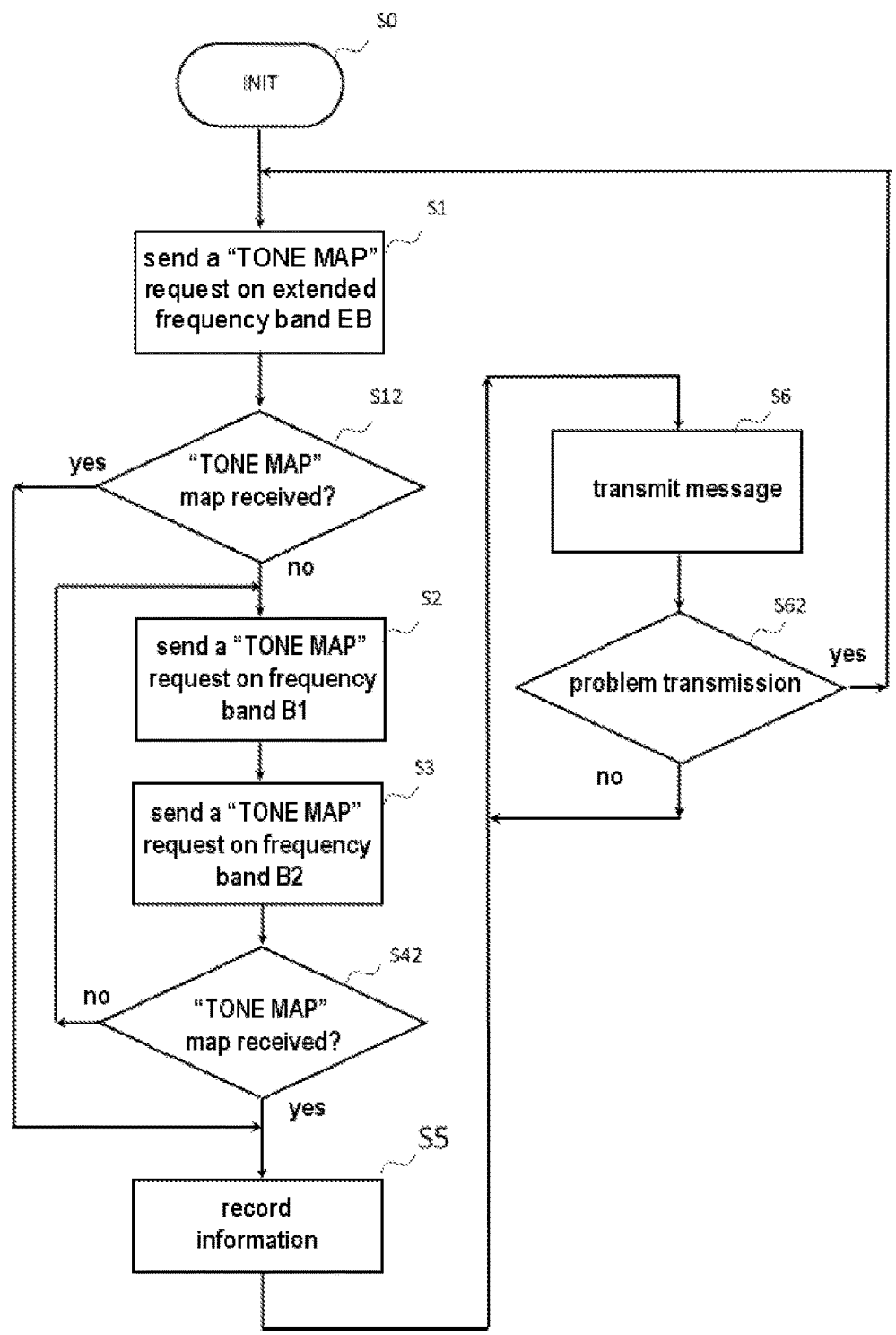
FIG. 6 is a flowchart showing a method for determining a communication mode according to one embodiment.

FIG. 6 is a flowchart illustrating a method for determining a mode of communication between two node devices neighbouring one another in the communication network 120, according to one embodiment. These node devices are by way of example the node device 133 operating as initiator node device and the neighbouring node device 134, operating as a target node device.

At the end of an initialization step S0, the node devices 133 and 134 are configured so as to communicate with one another in at least one communication mode for communicating in at least one frequency band. It is considered that the devices are then normally operational, at this stage, and that a message exchange may be initiated.

According to the embodiment illustrated in FIG. 6, the initiator node device 133, in step S1, sends a message comprising information according to which a channel estimate request in an extended frequency band EB is requested from the target node device, and awaits a possible message in response for a predetermined time. At the end of the predetermined period, the initiator node device 133, in step S12, checks whether a response has actually been received in the form of a message comprising information representative of a channel estimate in the frequency band EB. If so, the initiator node device 133, in step S5, records the received information representative of a channel estimate in the extended frequency band EB in its neighbourhood table NT-REC, and determines a preferred communication mode, taking into account in particular the various information available in the neighbourhood table NT-REC. For example, the initiator node device 133 determines that the communication mode for communicating in an extended frequency band EB is the most advantageous communication mode at this time for communicating with the target node device 134, and initiates transmission in this mode, in the extended frequency band EB, in step S6.

According to the embodiment, in the absence of any response from the target node device 134 after a predetermined time, the initiator node device 133 considers that the target node device 134 does not support communication in a communication mode for communicating in the extended band and, in steps S2 and S3, sends messages comprising a channel estimate request in the frequency band B1 and a channel estimate request in the frequency band B2, respectively. The initiator node device 133 then awaits a possible response to at least one of these two messages, or to each of these two messages, and records the information representative of one or more channel estimates received in response in one or more neighbourhood tables NT-REC, before communicating subsequently in step S6. If no message is received in response to a channel estimate request transmitted by the initiator node device, in step S42, the method returns to step S2 and the initiator node device again sends messages to the target node device until a response is obtained in at least one of the two frequency bands B1 and B2. A new message comprising a channel estimate request (TMR indicator set to 1, for example, in G3-PLC) may be sent as soon as data have to be transmitted to the target node device 134.

When communications are established in step S6, in a given communication mode between the two node devices, and in the absence of any communication problem detected in step S62 intended to define a communication quality level, communications continue in the selected communication mode. By contrast, if a communication quality problem is detected, the determination method is relaunched starting from step S1.

Advantageously, determining the transmission mode comprises a step of comparing first transmission quality indicators that are respectively determined, for each of the frequency bands, based on recorded information associated with each of the at least two frequency bands B1 and B2. If the received information, representative of one or more channel estimates, indicates that the available frequency bands exhibit significant interference, determining the transmission mode may furthermore comprise selecting what is called a "robust" transmission mode using BPSK modulation and systematic repetition of the transmitted bits (for example, each bit is repeated four times or six times during a transmission). The selection of what is called a "robust" transmission mode depends for example on a transmission quality level defined based on an estimate of a transmission channel established via a multi-band transmission in said at least two frequency bands B1 and B2.

Figure 7:
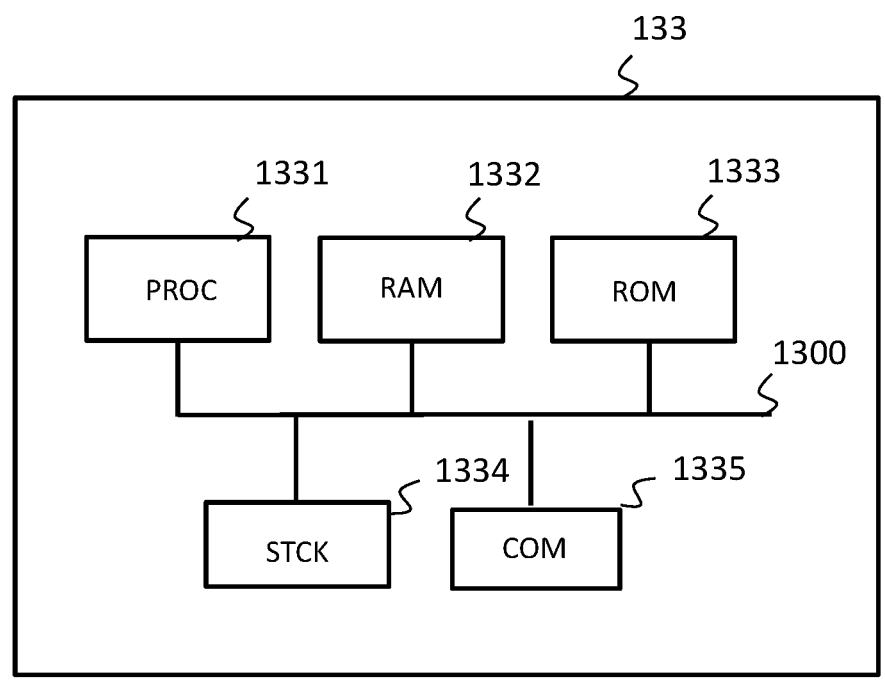
FIG. 7 is a schematic depiction of the architecture of a node device configured so as to execute the method for determining a communication mode shown in FIG. 6.

FIG. 7 schematically illustrates an exemplary internal architecture of any node device of the communication network 120. It will be considered by way of illustration that FIG. 7 illustrates an internal layout of the node device 133. Such a node device is said to be multi-band since it is capable of transmitting a message on a plurality of frequency bands. It will be noted that FIG. 7 could also schematically illustrate an exemplary hardware architecture of a processing module contained within the node device.

According to the exemplary hardware architecture shown in FIG. 7, the node device 133 then comprises the following, connected by a communication bus 1300: a processor or CPU ("Central Processing Unit") 1331; a RAM ("Random Access Memory") 1332; a ROM ("Read Only Memory") 1333; a storage unit such as a hard disk (or a storage medium reader, such as an SD ("Secure Digital") card reader) 1334; at least one communication interface 1335 allowing the node device 133 to communicate with the node devices belonging to its network neighbourhood, such as for example the node devices 134 and 137.

The processor 1301 is capable of executing instructions loaded into the RAM 1332 from the ROM 1333, from an external memory (not shown), from a storage medium (such as an SD card), or from a communication network. When the node device is turned on, the processor 1331 is capable of reading instructions from the RAM 1332 and executing them. These instructions form a computer program that causes the processor 1331 to implement all or some of the exchanges and methods described with reference to FIGS. 2, 3, 4 and 5.

All or some of the exchanges and methods described with reference to FIGS. 2, 3, 4 and 5 may be implemented in software form by executing a set of instructions using a programmable machine, for example a DSP ("Digital Signal Processor") or a microcontroller, or be implemented in hardware form by a machine or a dedicated component, for example an FPGA ("Field-Programmable Gate Array") or an ASIC ("Application-Specific Integrated Circuit"). In general, the node device 133 comprises electronic circuitry configured so as to implement the methods described with reference to the node device 133 (likewise the node device 134).

The invention claimed is:

1. A method for determining a mode of transmission between first and second node devices of a power line communication network, the first node device being located in the network neighbourhood of the second node device and vice versa, the first node device being configured so as to communicate in at least two frequency bands, and the second node device being configured so as to communicate in at least one of said at least two frequency bands, the method being executed by the first node device, the method comprising:
   transmitting a copy of a first message to the second node device in each of said at least two frequency bands, said first message comprising information according to which a channel estimate is requested from the second node device by said first node device,
   transmitting, on an extended frequency band, a message comprising a reference to said extended frequency band to the second node device, said extended frequency band comprising said at least two frequency bands, and said message comprising information according to which a channel estimate of said extended frequency band is requested from the second node device by said first node device,
   receiving a second message transmitted by the second node device on each frequency band via which the second node device has received a message comprising information according to which a channel estimate is requested, each second message comprising information representative of a channel estimate for the frequency band via which said second message is received,
   the first node device recording the information, representative of the channel estimate, contained in each received second message, and
   determining, based on the recorded information, a transmission mode for transmitting a third message to be transmitted subsequently from the first node device to the second node device.

2. The method according to claim 1, the method furthermore comprising transmitting a fourth message, comprising a reference to a frequency band called "extended band", to the second node device, said extended frequency band comprising said at least two frequency bands, and said fourth message comprising information according to which a channel estimate of said extended frequency band is requested from the second node device by said first node device.

3. The method according to claim 1, wherein determining a transmission mode comprises a step of comparing first transmission quality indicators that are respectively determined, for each of the frequency bands, based on recorded information associated with each of the at least two sub-bands.

4. The method according to claim 1, wherein determining a transmission mode furthermore comprises selecting what is called a "robust" transmission mode according to a quality level defined based on an estimate of a transmission channel established via a multi-band transmission in said at least two frequency bands, preferably using BPSK modulation and repetition of the transmitted bits.

5. The method according to claim 1, wherein said at least two frequency bands are chosen from among the following group: CENELEC A frequency band, CENELEC B frequency band, and FCC frequency band or ARIB frequency band.

6. The method according to claim 1, wherein said information according to which a channel estimate is requested from the second node device by said first node device is a Tone Map Request indicator of a frame control header defined according to the ITU-T G9903 recommendation and the information representative of at least one channel estimate and received from the second node device is contained in a Tone Map Response message defined according to the ITU-T G9903 recommendation.

7. A node device intended to be used in a power line communication network, said node device being configured so as to communicate with a second node device located in its network neighbourhood and so as to communicate in at least two frequency bands, and the second node device being configured so as to communicate in at least one of said at least two frequency bands, the node device comprising:
   a transmission module configured so as to transmit, to the second node device in at least two frequency bands, a copy of a first message comprising, in each of the at least two frequency bands, information according to which a channel estimate is requested from the second node device,
   a transmission module for transmitting, in a frequency band called "extended band", a message comprising a reference to said extended frequency band to the second node device, said extended frequency band comprising said at least two frequency bands, and said message comprising information according to which a channel estimate of said extended frequency band is requested from the second node device by said first node device,
   a reception module for receiving at least one second message, transmitted from the second node device on each frequency band via which the second node device has received a message comprising information according to which a channel estimate is requested, each second message comprising information representative of a channel estimate for the frequency band via which said second message is received, a recording module configured so as to record, in a memory of said node device, the one or more items of information representative of at least one channel estimate, received from said second node device, a control unit configured so as to determine, based on the information recorded in said memory, a transmission mode for transmitting a third message to be transmitted subsequently from said node device to the second node device.

8. A non-transitory information storage medium comprising a computer program product, wherein it comprises program code instructions for executing the steps of the method according to claim 1 when said program is executed by a processor.

\* \* \* \* \*